(12) United States Patent
Huang

(10) Patent No.: US 6,347,580 B1
(45) Date of Patent: Feb. 19, 2002

(54) JUICE MAKER

(75) Inventor: Chyong-yen Huang, Taipei (TW)

(73) Assignee: Atom Technology Inc., Taipei (TW)

( * ) Notice: Subject to any disclaimer, the term of this patent is extended or adjusted under 35 U.S.C. 154(b) by 0 days.

(21) Appl. No.: 09/928,696

(22) Filed: Aug. 14, 2001

(51) Int. Cl.⁷ .............................. A23N 1/00; A47J 19/02
(52) U.S. Cl. ........................... 99/504; 99/501; 99/506; 99/507; 99/508
(58) Field of Search ............................ 99/495, 501–508, 99/595; 100/125, 98 R, 213, 283, 110, 131–135; D7/665, 666; 210/307, 514

(56) References Cited

U.S. PATENT DOCUMENTS

| | | | | |
|---|---|---|---|---|
| 1,115,754 A | * | 11/1914 | Walker | 99/507 |
| 2,018,932 A | * | 10/1935 | Thorne | 99/508 X |
| 2,042,341 A | * | 5/1936 | Ilgenfritz | 99/506 X |
| 2,099,170 A | * | 11/1937 | Majewski, Jr. | 99/495 X |
| 2,160,523 A | * | 5/1939 | Scurlock | 99/507 |
| 2,238,571 A | * | 4/1941 | Scott | 99/508 X |
| 2,497,335 A | * | 2/1950 | Wissner | 99/495 X |
| 2,674,182 A | * | 4/1954 | Kirkpatrick | 100/98 R |
| 2,786,502 A | * | 3/1957 | Turner | 100/288 X |
| 4,530,277 A | * | 7/1985 | Matsumoto | 100/131 X |
| 5,084,177 A | * | 1/1992 | Keene | 210/514 |
| 5,510,028 A | * | 4/1996 | Kuhlman | 210/307 |
| 5,520,105 A | * | 5/1996 | Healy | 100/98 R |

* cited by examiner

Primary Examiner—Timothy F. Simone
(74) Attorney, Agent, or Firm—Rosenberg, Klein & Lee

(57) ABSTRACT

A juice maker uses a handle to control an upper mold to move upward or downward, which corresponds to a lower mold at underneath, and the lower mold is controlled by the handle to turn, when the upper mold is driven to move upward or downward, the lower mold will turn to squeeze juice from a fruit seating in a barrel of the machine.

1 Claim, 7 Drawing Sheets

JUICE MAKER

BACKGROUND OF THE INVENTION

1. Field of the Invention

This invention relates to a juice maker, more particularly to a machine to squeeze fruit to get juice.

2. Description of the Prior Art

A conventional juice maker comprises an upper mold and a lower mold corresponding to the upper mold. The upper mold is controlled by a handle to move up and down, which squeezes the fruit seating in the lower mold to get juice. However, due to the design of the upper mold comprises many recesses which always keep some particles in preventing from being squeezed.

In view of this, the inventor has designed the present invention to solve the problem.

SUMMARY OF THE INVENTION

It is the primary object of the present invention to provide a juice maker, which can squeeze fruit thoroughly to get juice.

It is another object of the present invention to provide a juice maker, which is easy to operate.

DETAILED DESCRIPTION OF THE PREFERRED EMBODIMENTS

Figure 1:
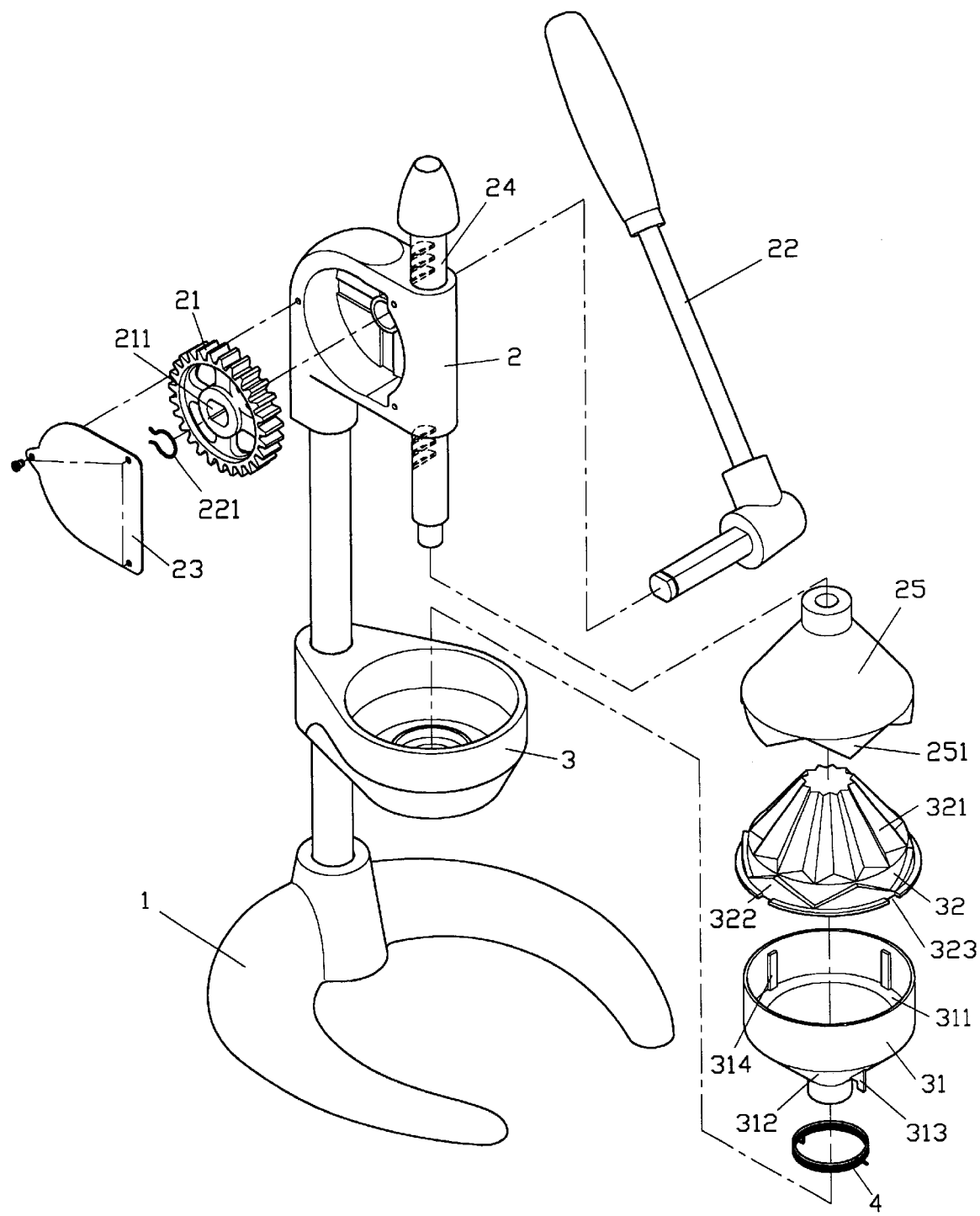
FIG. 1 is an exploded view of the present invention.

A juice maker of the present invention comprises a base 1 to be seating on a flat surface, a transmission mechanism 2 secured on its top portion thereof, and a receiving seat 3 at its center thereof, as shown in FIG. 1.

The transmission mechanism 2 comprises a wheel 21 in its center portion with a rectangle-shaped hole 211 at center thereof for insertion of a shaft of a handle 22 through there and then sealed by a snap ring 221 from the other side, a cover 23 is used to cover the wheel 21 in the transmission mechanism 2. The transmission mechanism 2 further comprises a shaft 24 with gear holes thereon, which meshes with the gear of the wheel 21. The bottom end of the shaft 24 is connected with an upper mold 25 which comprises a driving gear 251 at its bottom end. When moving the handle 22, the transmission mechanism 2 drives the shaft 24 to roll up or down, which then brings the upper mold 25 to move, simultaneously.

The receiving seat 3 has a hollow body located underneath the upper mold 25, and is composed of a barrel 31 and a lower mold 32. The barrel 31 has a ring stopper 311 at its bottom edge and a funnel 312 at the bottom end. The funnel 312 has a lug 313 at one side. The lower mold 32 has a conical seat 321 corresponding to the slope shape of the upper mold 25 with star-shaped. The bottom end of the conical seat 321 has a driven gear 322 and the receiving seat 31 has ribs 314 which engage with notches 323 of the conical seat 321.

Figure 2:
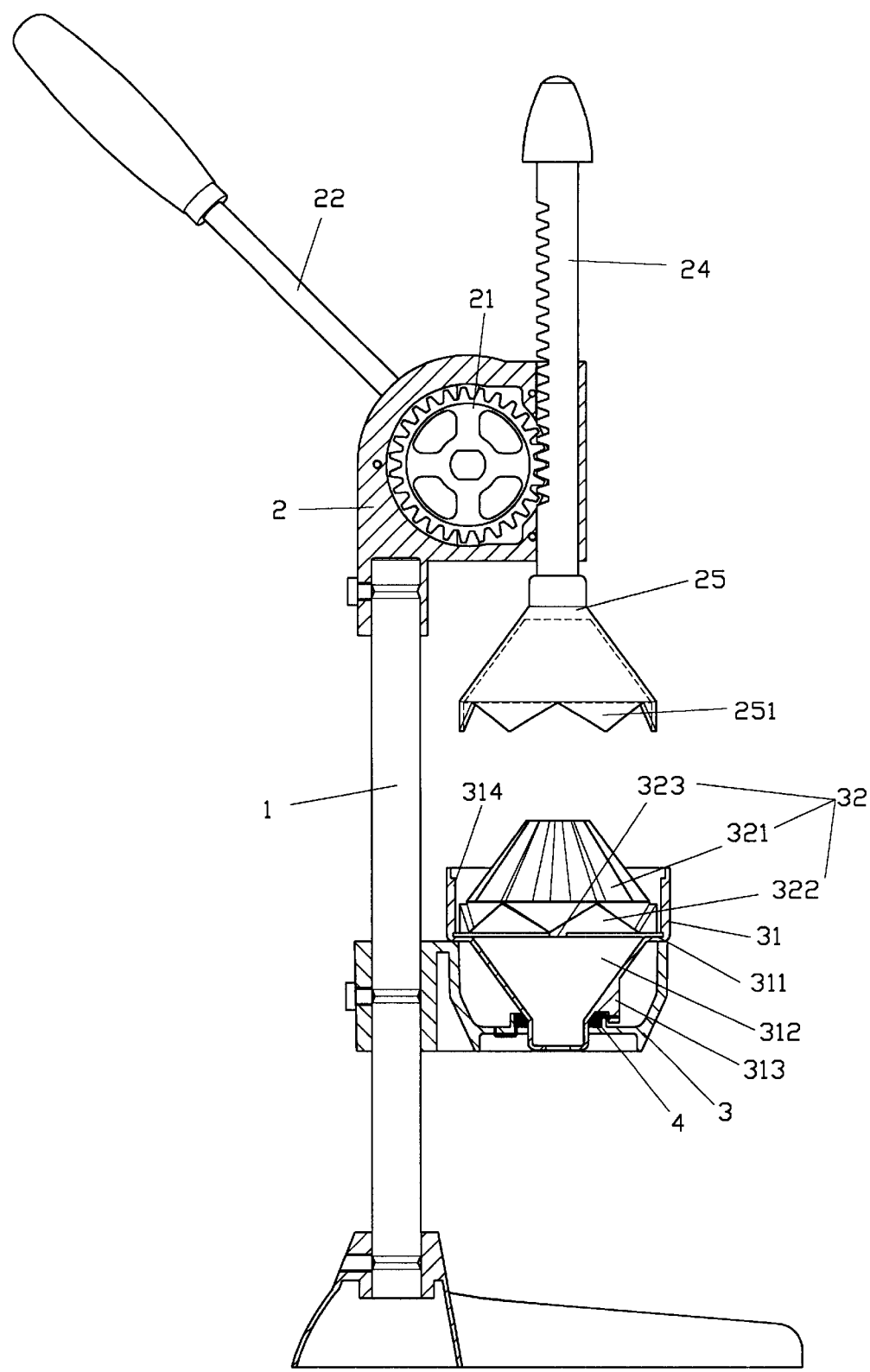
FIG. 2 is a side view of FIG. 1, with partial sectioned.

To assemble, as shown in FIG. 2, the barrel 31 with a torque spring 4 are placed in the receiving seat 3, one end of the torque spring 4 is secured in the lug 313 of the barrel 31, while the other end of the torque spring 4 is secured to the bottom end of the receiving seat 3, that provides a restoring force to the barrel 31. The lower mold 32 is slid into the receiving seat 3 with the notches 323 line up with the ribs 314 until the bottom end of the lower mold 32 reaches the stopper 311 of the barrel 31.

Figure 3:
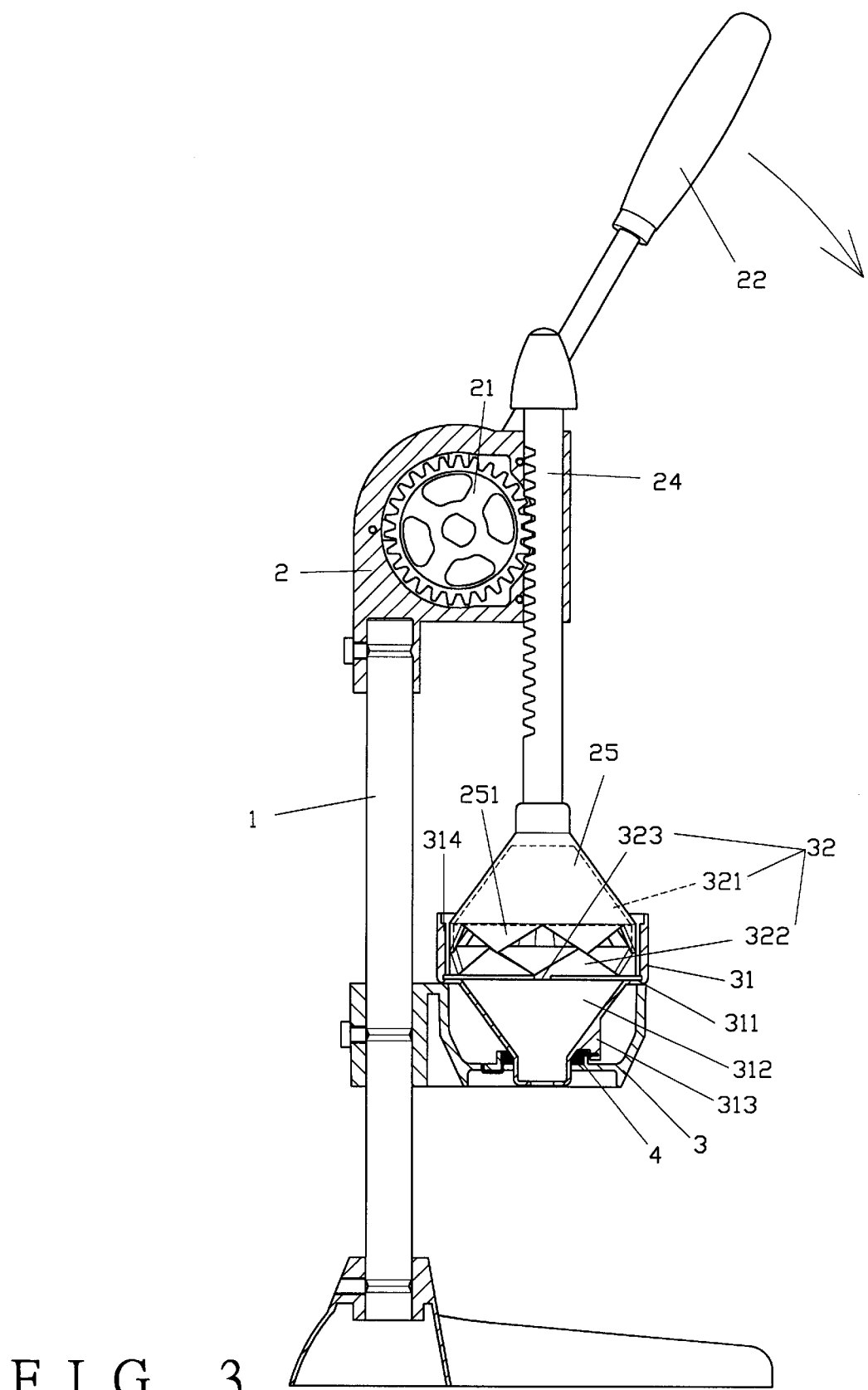
FIG. 3 is a view similar to FIG. 2, showing a handle of the present invention at first movement.
Figure 4:
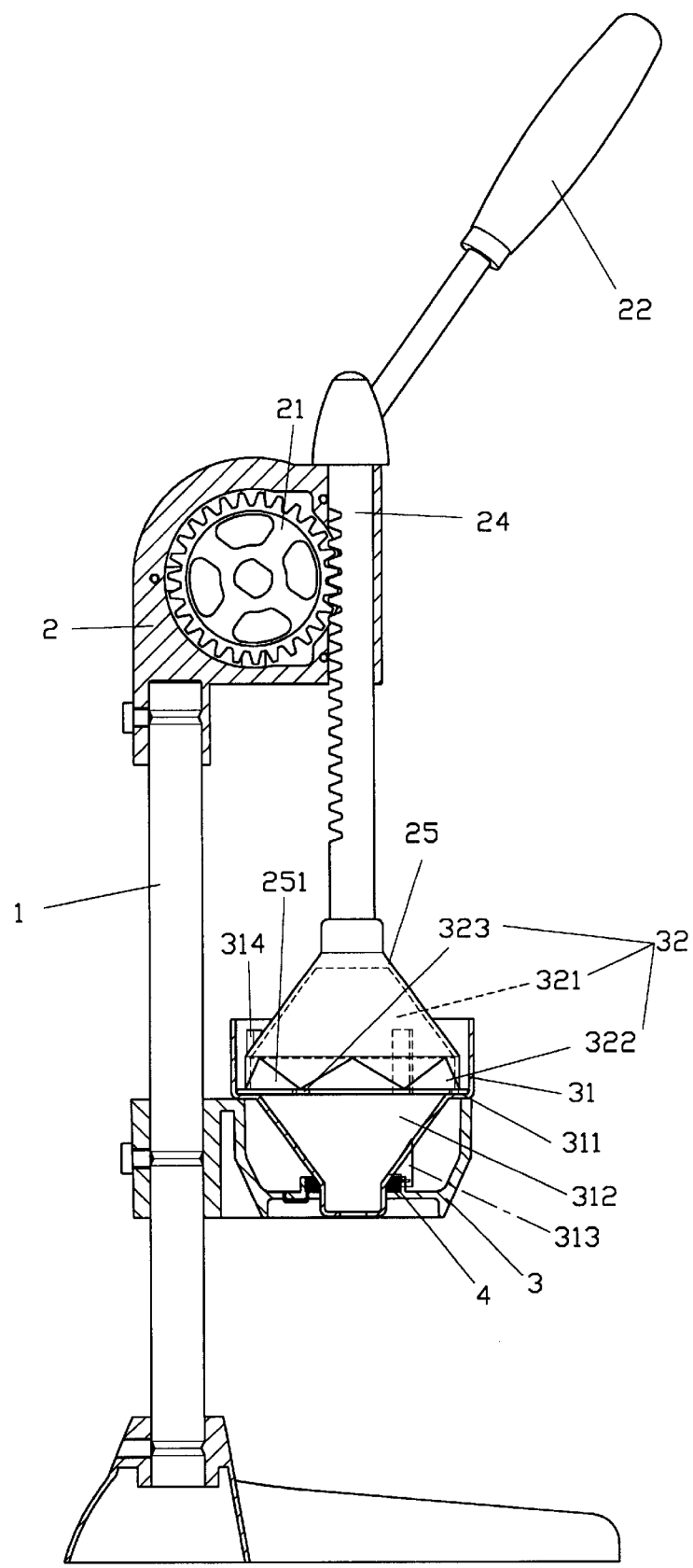
FIG. 4 is a view similar to FIG. 3 showing the handle at a second movement.

To operate the juice maker, as shown in FIGS. 3 and 4, the handle 22 is pulled, which links the wheel 2 to move, and then links the upper mold 21 to move up or down. When the driving gear 251 of the upper mold 25 reaches the driven gear 322 of the lower mold 32, the lower mold 32 and the receiving seat 31 will be forced to rotate, when the upper mold 25 moves upward away from the lower mold 32, the torque spring 4 urges the lower mold 32 and the receiving seat 31 return to its original position.

When the upper mold 25 moves downward and press the lower mold 32 (before the driving gear 251 engaging with the driven gear 322), most particles of the fruit will be squeezed. Upon the driving gear 251 reaches to the driven gear 322, those particles remain in the corner or the valley of the conical seat 321 will be pressed to release juice.

Figure 5:
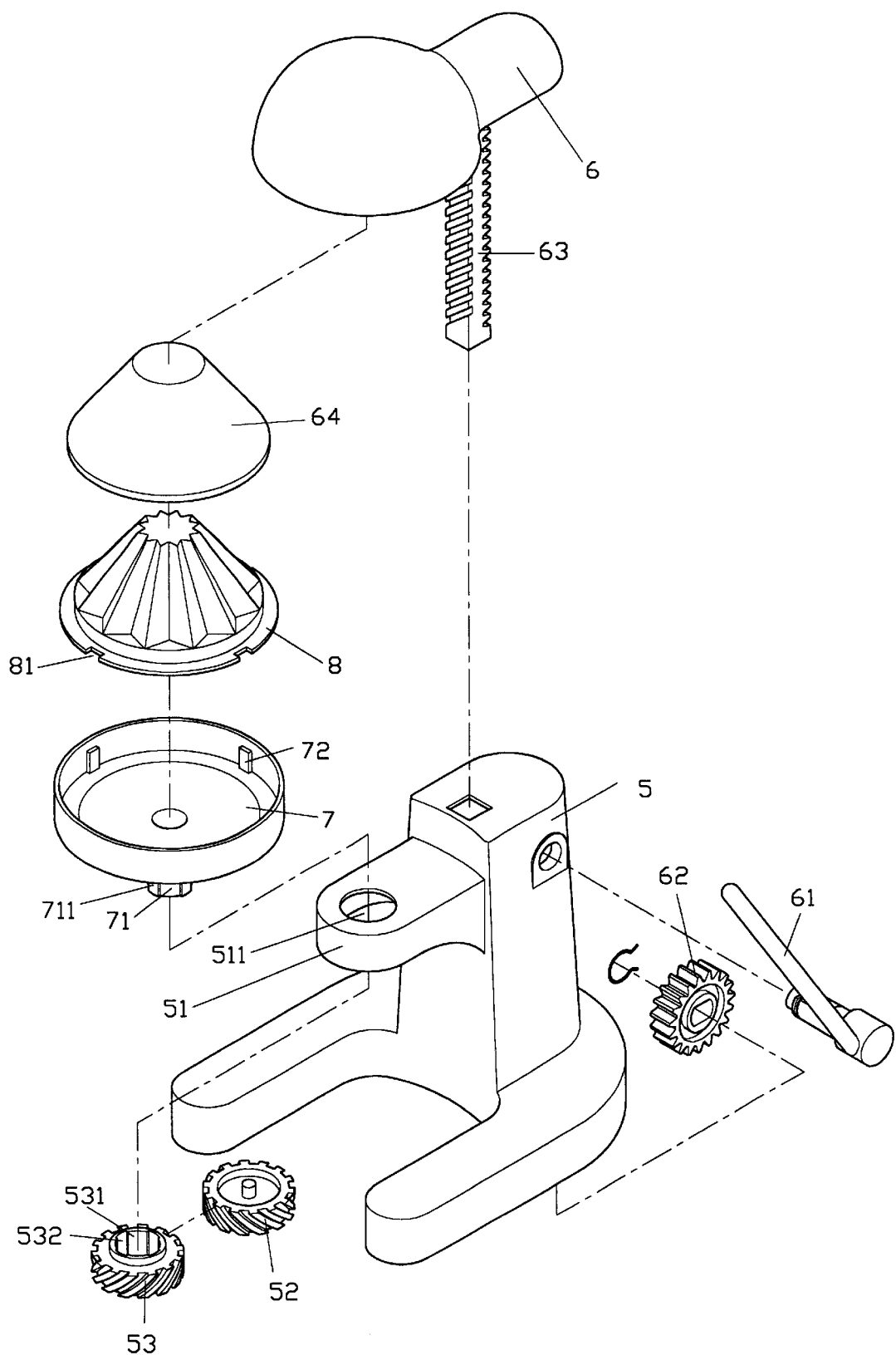
FIG. 5 is an exploded view of a second embodiment.

A second embodiment of a juice maker of the present invention, as shown in FIG. 5, comprises a base 5 and a transmission mechanism 6 secured on the top portion thereof. The transmission mechanism 6 has an upper mold 64 attached to the top and a transmission shaft 63 extending downwardly. The transmission shaft 63 with gears meshes with a gear 62 which is controlled by a handle 61. A receiving seat 51 is formed underneath the upper mold 64 with a hole 511 at its center portion to accept a pair of driving gears 52 and 53 therein. The driving gear 52 meshes with the transmission shaft 63 of the transmission mechanism 6, whereas the other driving gear 53 is formed with groves 532 on the inner wall of a hole 531 for corresponding ribs 711 of a post 71 of a barrel 7 for securing purpose. The barrel 7 comprises a number of ribs 72 along its inner sidewall adapted for corresponding notches 81 of a lower mold 8 to slide thereat.

Figure 6:
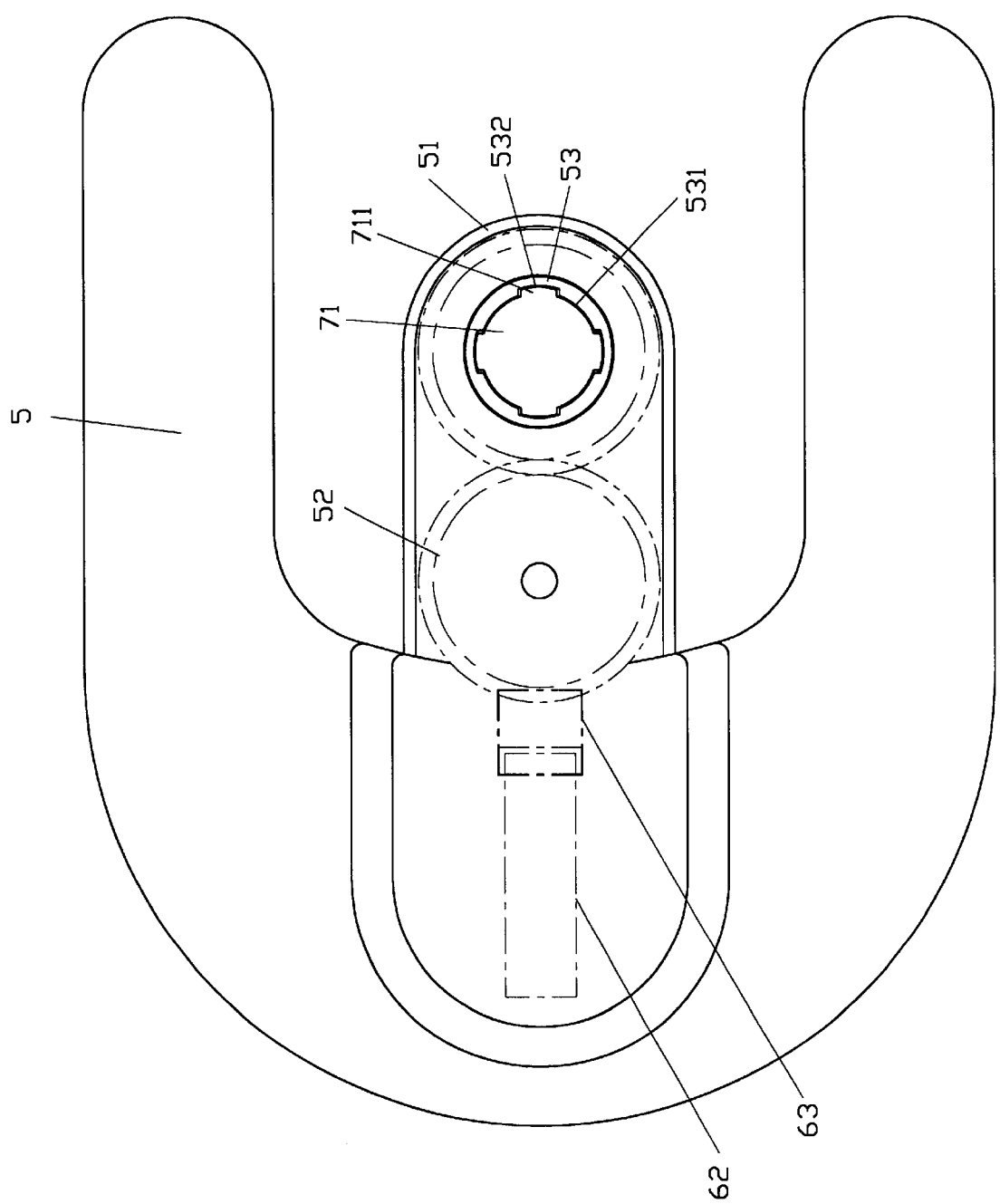
FIG. 6 is a top view of FIG. 5.
Figure 7:
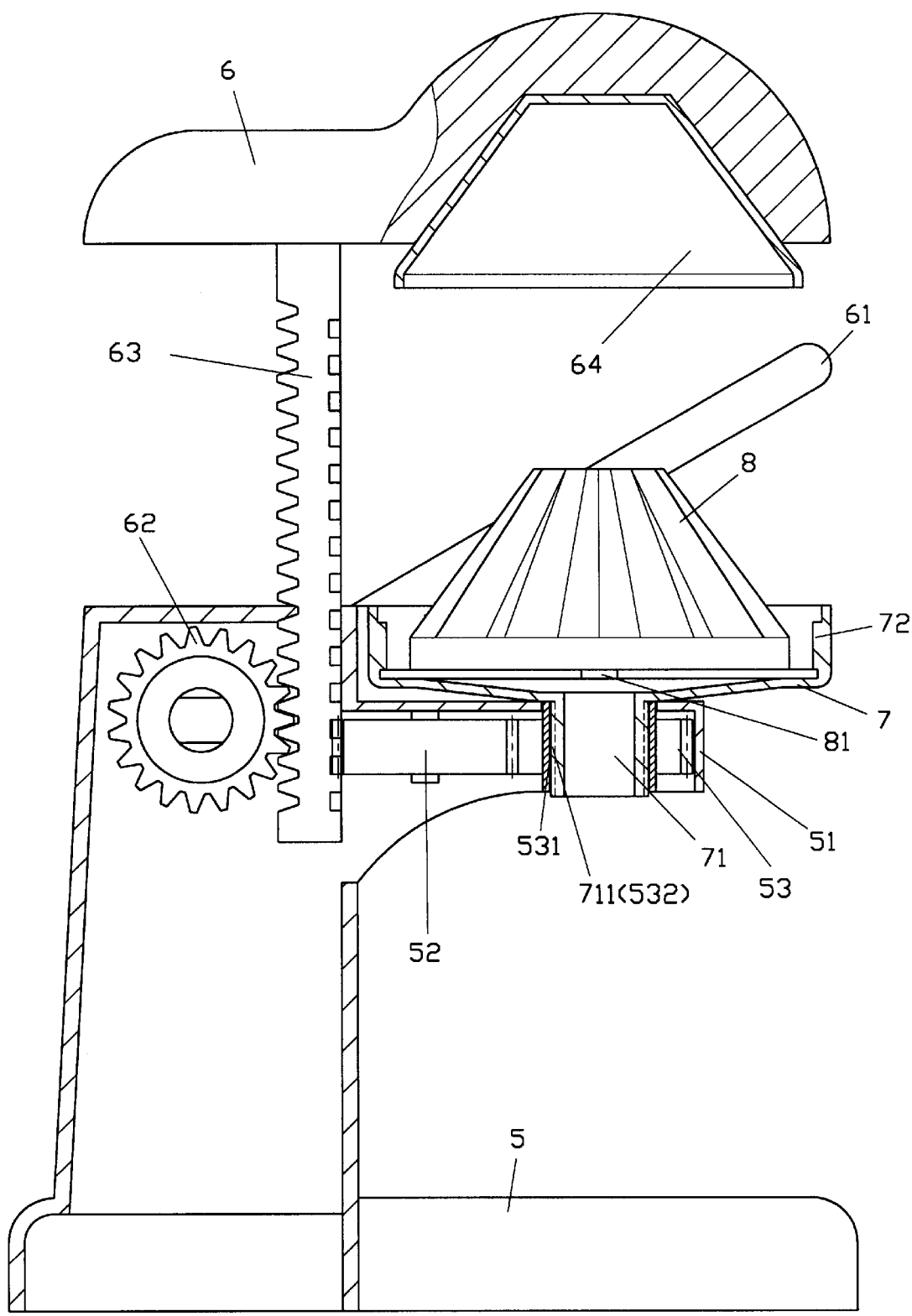
FIG. 7 is a side view of FIG. 5, partially sectioned.

To assemble the present invention, as shown in FIGS. 6 and 7, the gear 62 is slid into the base 5, and the handle 61 is inserted sideway into the base 5 through a center hole of the gear 62, the post 71 of the barrel 7 is inserted into the hole 511 of the receiving seat 5 with the ribs 711 sliding into the grooves 532 of the hole 531 of the driving gear 53, then the lower mold 8 is placed into the barrel 7 with the notches 81 sliding along the ribs 72.

To operate the present invention, the handle 61 is rolled down, which links the transmission shaft 63 sliding down and the driving gears 52 and 53 will be activated simultaneously, which links the lower mold 8 and the barrel 7 to rotate. When the handle 61 is pulled upwardly, the driving gears 52 and 53 will bring the barrel 7 return to its original position.

Both of the above embodiments depict a rotation movement of the lower mold when the upper mold is moved, thus, the present invention is characterized in that press down and rotation.

While there has been described and illustrated two specific embodiments of the invention, it will be clear that variation in the details of the embodiments specially illustrated and described may be made without departing from the true spirit and scope of the invention as defined in the appended claims, such as the handle may be in up and down movement or in a rotation movement, and the gears may be in any other forms.

I claim:

1. A juice maker comprising a base having a handle linking an upper mold to move up and down motion, a lower mold underneath said upper mold, and is characterized in that said lower mold being indirectly controlled by said handle to rotate, and when said upper mold moving bringing said lower mold to rotate, to form a combination of press down and rotation movement.

* * * * *